(12) United States Patent
Takayanagi et al.

(10) Patent No.: US 7,746,628 B2
(45) Date of Patent: Jun. 29, 2010

(54) ELECTRONIC DEVICE

(75) Inventors: Masaya Takayanagi, Kawasaki (JP); Masaki Iwata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/219,308

(22) Filed: Jul. 18, 2008

(65) Prior Publication Data

US 2009/0059494 A1 Mar. 5, 2009

(30) Foreign Application Priority Data

Aug. 31, 2007 (JP) ............................. 2007-226781

(51) Int. Cl.
G06F 1/16 (2006.01)
(52) U.S. Cl. ..................... 361/679.27; 361/679.29; 312/223.1; 312/223.2; 16/221; 16/342
(58) Field of Classification Search ............ 361/679.27
See application file for complete search history.

(56) References Cited

U.S. PATENT DOCUMENTS

| | | | |
|---|---|---|---|
| 5,844,774 A * | 12/1998 | Gushiken et al. ....... | 361/679.27 |
| 6,064,565 A | 5/2000 | Ishihara et al. | |
| 6,272,006 B1 * | 8/2001 | Lee ...................... | 361/679.27 |
| 6,657,856 B1 * | 12/2003 | Lu ........................ | 361/679.58 |
| 6,989,986 B2 | 1/2006 | Kumagai et al. | |
| 2001/0001591 A1 * | 5/2001 | Nakajima et al. ........... | 361/683 |
| 2004/0184224 A1 | 9/2004 | Kumagai et al. | |
| 2006/0002068 A1 * | 1/2006 | Kim ........................... | 361/683 |
| 2006/0133026 A1 * | 6/2006 | Tokoro et al. ............... | 361/683 |
| 2006/0171106 A1 * | 8/2006 | Cho et al. .................... | 361/681 |
| 2006/0262496 A1 * | 11/2006 | Lee ............................. | 361/683 |
| 2007/0047183 A1 | 3/2007 | Goto et al. | |
| 2007/0146978 A1 * | 6/2007 | Nakatani et al. ............ | 361/681 |
| 2009/0040706 A1 * | 2/2009 | Kobayashi et al. .......... | 361/681 |

FOREIGN PATENT DOCUMENTS

| | | |
|---|---|---|
| EP | 1406231 | 4/2004 |
| JP | 10-268971 | 10/1998 |
| JP | 11-085319 | 3/1999 |
| JP | 2007-058583 A | 3/2007 |
| WO | WO03/009263 | 1/2003 |

OTHER PUBLICATIONS

Office Action mailed by Korean Patent Office on Jan. 18, 2010. No English translation is available.

* cited by examiner

*Primary Examiner*—Jayprakash N Gandhi
*Assistant Examiner*—Anthony Q Edwards
(74) *Attorney, Agent, or Firm*—Fujitsu Patent Center

(57) ABSTRACT

The present invention relates to an electronic device having two casings connected with each other through a hinge member such that the casings can open and close with respect to each other. The electronic device includes a hinge member suitable for mounting a large size display panel. The second casing includes a back face and a sidewall having a projection which projects inward between the back face and the sidewall, the hinge member includes a first fixing member fixed to the first casing and a second fixing member fixed to the second casing, and one end of the second fixing member is engaged with and fixed to the second casing in a state where the one end enters a gap between the back face and the projection.

10 Claims, 9 Drawing Sheets

ELECTRONIC DEVICE

BACKGROUND OF THE INVENTION

1. Field of the Invention

The present invention relates to an electronic device having two casings which are connected to each other by means of a hinge member such that the casings can open and close.

2. Description of the Related Art

In recent years, personal computer (or PC, hereinafter) penetration has been increased not only in offices but also homes. As one example of such a personal computer, a so-called notebook personal computer (notebook PC, hereinafter) is widely known. The notebook PC includes a first casing which is a main body unit provided at its upper face with a keyboard, and a second casing which is a display unit having a display panel. The second casing is connected to the first casing by means of a hinge member such that the second casing can open and close with respect to the first casing. When the notebook PC is used, the second casing is opened with respect to the first casing to a standing position, and when the notebook PC is not used, the second casing is folded such that the second casing is overlapped on the first casing.

As for the notebook PC, it is required to make a screen to be mounted in a casing as large as possible while making the casing as small as possible. To realize this, it is conceived that the notebook PC has a display panel which spreads to the limit width of the second casing in the lateral direction.

In order to open and close the second casing with respect to the first casing, a large load is applied to a lower portion of the second casing on which the hinge member is mounted. Therefore, the hinge member is extended between an inner face of a sidewall of the second casing and a side face of the display panel, and the hinge member is screwed.

However, when it is conceived to mount a display screen of a large size while keeping the outer size of the second casing as it is, even a space for extending the hinge member and screwing the same can not be secured between the inner face of the sidewall of the second casing and the side face of the display panel.

International Patent Application Publication No. WO2003/009263 discloses a structure in which to mount a large size display panel within the casing, it is fixed to the casing at three locations, i.e. , both left and right sides and a central portion of an upper face of the display panel by means of fixing hardware.

However, according to the structure of WO2003/009263, the fixing hardware is disposed between both the left and right sides of the display panel and the sidewall of the casing, only a small size display panel can be mounted correspondingly, and no scheme of the hinge member is shown.

SUMMARY OF THE INVENTION

The present invention has been made in view of the above circumstances and provides an electronic device having a hinge member suitable for mounting a large size display panel.

An electronic device according to the present invention includes:

a first casing;

a second casing having a display panel provided with a display screen which displays information and which is exposed; and a hinge member which connects the second casing and the first casing with each other such that the second casing can open and close with respect to the first casing, wherein the second casing includes a back face and a sidewall having a projection which projects inward between the back face and the sidewall, the hinge member includes a first fixing member fixed to the first casing and a second fixing member fixed to the second casing, and one end of the second fixing member is engaged with and fixed to the second casing in a state where the one end enters a gap between the back face and the projection.

According to the electronic device of the invention, the portion of the second fixing member fixed to the second casing is engaged with and fixed to the projection as described above. Therefore, it is unnecessary that the second fixing member extends long along the side face of the display panel, and this is suitable for a case in which a large size display panel is mounted.

Here, a back face of the display panel may be overlapped on the projection.

With this, a large size display panel is mounted.

A side face of the display panel may be mounted on the second casing in a state where the side face of the display panel is in contact with an inner face of the sidewall.

According to the invention, the lateral width of the display panel can be increased until the display panel comes into contact with the inner face of the sidewall of the second casing regardless of the hinge member being fixed.

It is preferable that the second fixing member includes a fastening hole on a rotation axis of the hinge member, and the second fixing member is fastened to the second casing using the fastening hole.

In the electronic device of the invention, it is preferable that the one end of the second fixing member enters the gap, and the other end of the second fixing member is fastened to the second casing.

Since the one end enters the gap, and the other end is fastened, the second fixing member is stably fixed.

In this case, it is preferable that the second fixing member spreads into a plate shape from the one end to the other end while passing on the side of the back face of the display panel, and that the other end extends below a lower end face of the display panel, and is fastened to the second casing at a location where the other end is not overlapped on the display panel.

The portion of the second fixing member which is overlapped with the display panel is formed into the plate shape. With this, the thickness is reduced, and a load applied to the second casing when it is opened and closed can be dispersed and received by a wide area. Further, since the second fixing member is fixed at a location where it is not overlapped with the display panel, it can be fixed strongly.

In this case, it is preferable that the other end of the second fixing member is bent in a direction in which the rotation axis of the hinge member is a normal and rises in a thickness direction of the second casing, and the other end is further bent in a direction parallel to the back face of the second casing and is formed with a screwing fastening hole, the second casing is provided at its portion corresponding to the fastening hole with a boss which projects from the back face of the second casing and which is formed with a screw hole, and the second fixing member is fastened to the second casing by a screw member which is inserted into the fastening hole and threadedly inserted into the screw hole.

The rotation axis of the hinge member is bent in the direction where the rotation axis is the normal. With this, it becomes stronger against the load applied to the second casing as compared with the case in which it is bent in a direction parallel to the rotation axis.

The second casing may be formed with a section from which the display screen is exposed, the second casing including a frame member having a fastening hole of the second fixing member, the second casing may be provided at its portion corresponding to the fastening hole with a boss which projects from the back face of the second casing and which is formed with a screw hole, and the second fixing member may be fastened to the second casing by a screw member which is inserted into the fastening hole of the second fixing member through the fastening hole of the frame member and which is threadedly inserted into the screw hole.

In the electronic device of the invention, it is preferable that the second casing is made of conductive material, and that the electronic device further includes a grounding member whose one end is in contact with the display panel and whose other end is fastened to the second casing together with the second fixing member.

In this case, the display panel is grounded using the fastening portion of the hinge member as it is, and it is possible to prevent static electricity from being generated.

In the electronic device of the invention, the first casing may have an arithmetic circuit incorporated therein for carrying out arithmetic processing, and the first casing may be provided at its upper face with a keyboard for inputting a command corresponding to an operation.

The present invention can suitably be applied to a notebook PC which is a portable electronic device.

According to the above-described invention, it is possible to provide an electronic device having a hinge member suitable for mounting a large size display panel.

DETAILED DESCRIPTION OF THE INVENTION

An embodiment of the present invention will be described.

Figure 1:
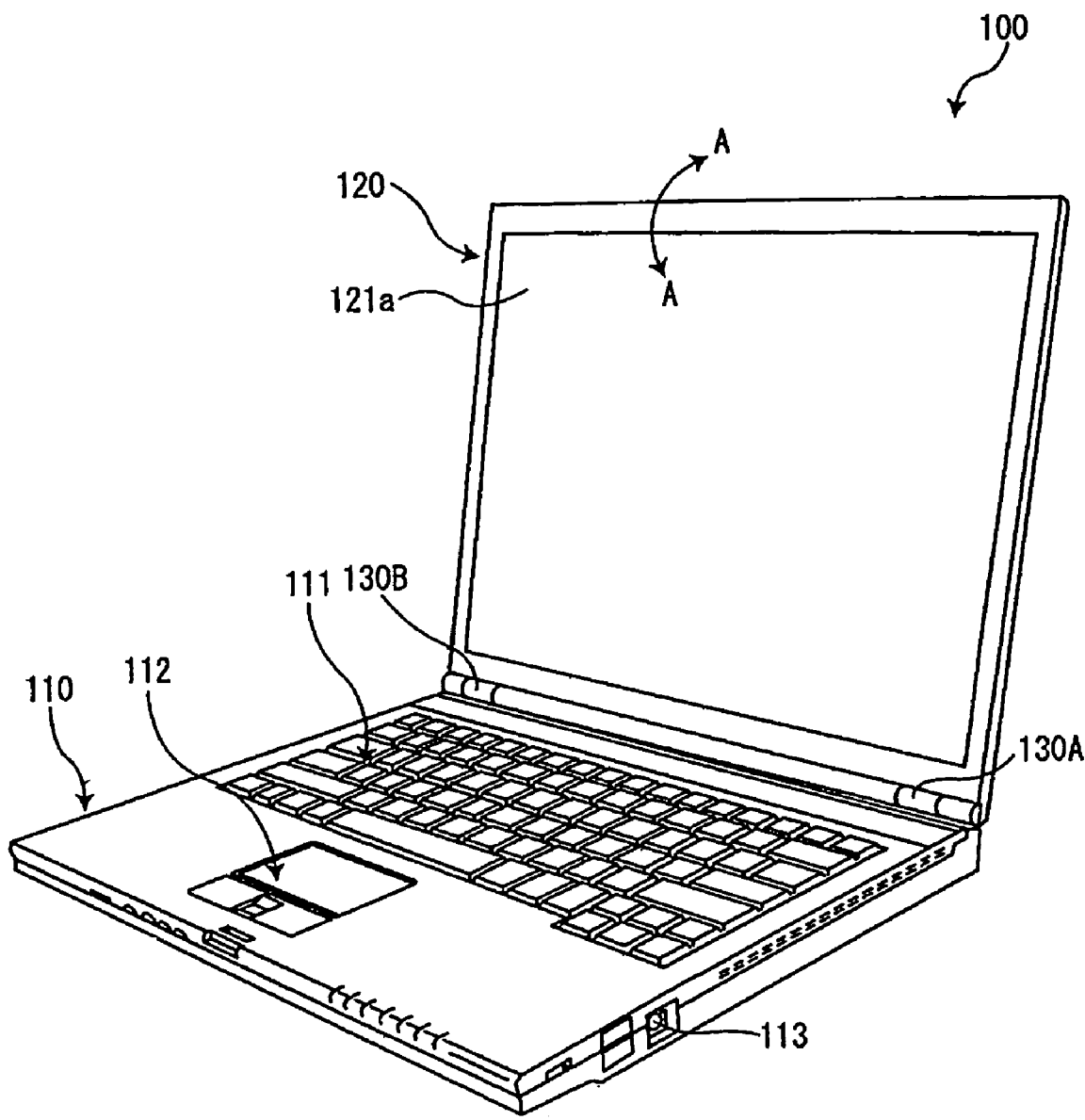
FIG. 1 is a perspective view showing an outer appearance of an open state of a notebook PC as one embodiment of an electronic device according to the present invention.

FIG. 1 is a perspective view showing an outer appearance of an open state of a notebook PC as one embodiment of an electronic device according to the present invention.

A notebook PC 100 shown in FIG. 1 includes a first casing 110, a second casing 120, and hinge members 130A and 130B which connect the second casing 120 to the first casing 110 such that the second casing 120 can open and close in the direction of the arrow A-A in FIG. 1.

A CPU which carries out arithmetic processing by executing a program, a hard disk unit in which the program is stored, and a memory in which the program is developed are incorporated in the first casing 110. A keyboard 111 for inputting commands in accordance with operation, and a trackpad 112 are disposed on an upper face of the first casing 110. The trackpad 112 is designed to move a cursor on a display screen 121a (which will be described later) by tracing using a finger so as to designate an icon or the like located at a current position of the cursor by a button operation. In addition, an electricity supply port 113 which receives electricity supplied from an AC adapter (not shown) and other devices are disposed on a side face of the first casing 110. These are general constituent elements as the notebook PC, and description thereof will be omitted.

In the second casing 110, the display panel having the display screen 121a for displaying information is mounted in a state where the front face of the display screen 121a is exposed.

Figure 2:
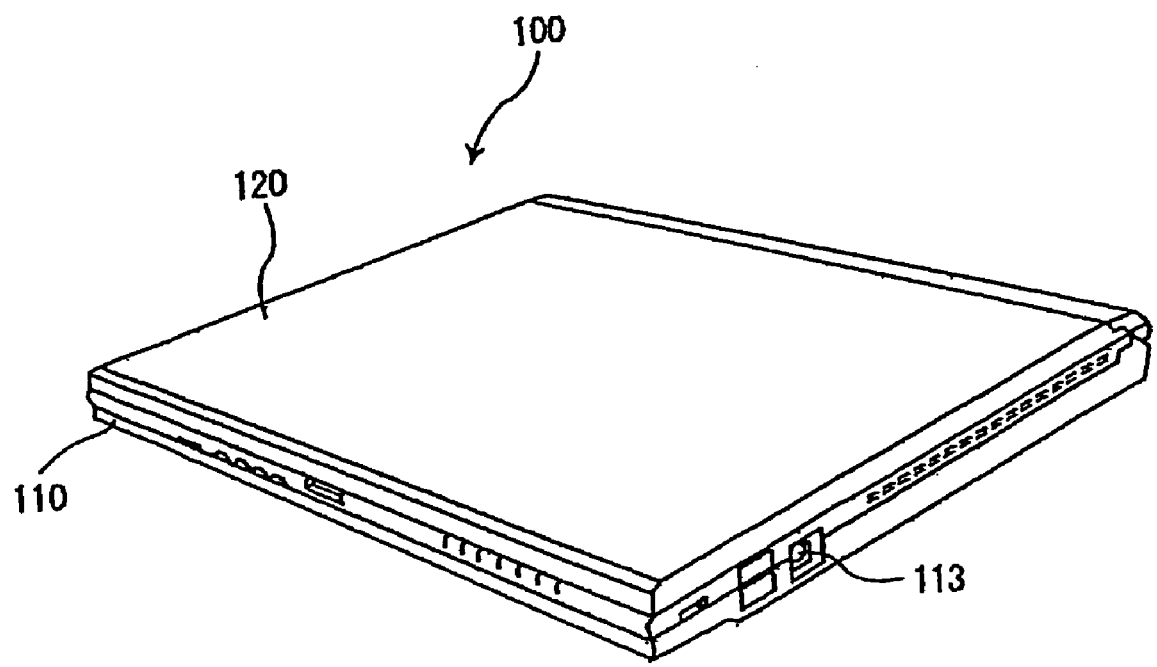
FIG. 2 is a perspective view showing an outer appearance of the notebook PC shown in FIG. 1 in its close state.

FIG. 2 is a perspective view showing an outer appearance of the notebook PC shown in FIG. 1 in its close state.

The second casing 120 is closed, as shown in FIG. 2, onto the first casing 110 such that the display screen 121a (see FIG. 1) is oriented toward the first casing 110. When the notebook PC is used, the second casing 120 is opened as shown in FIG. 1. If the second casing 120 is closed onto the first casing 110, the notebook PC 100 can easily be carried.

Figure 3:
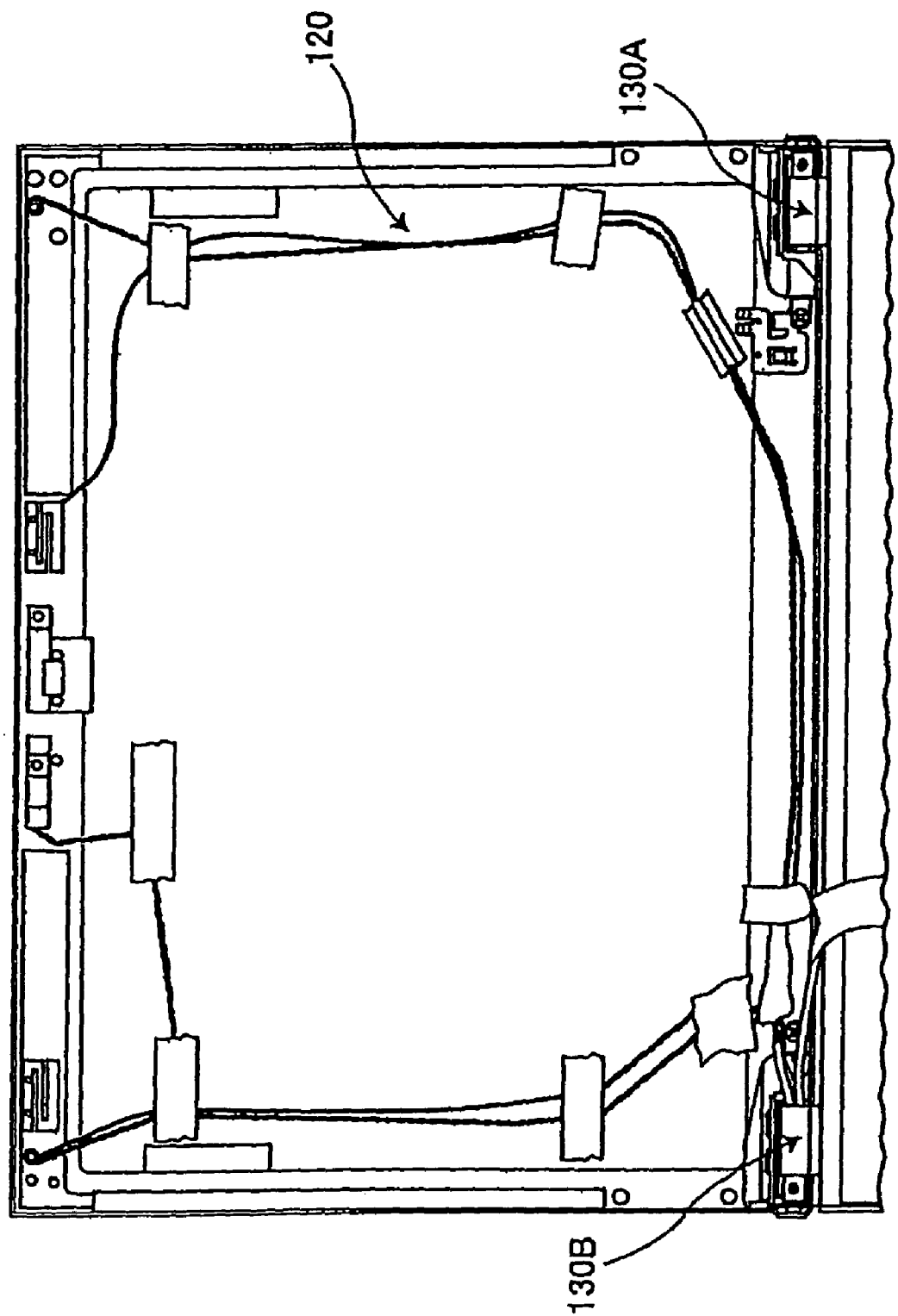
FIG. 3 is a view showing inside of a back face of a second casing by removing a display panel from the second casing.

FIG. 3 is a view showing inside of a back face of the second casing by removing the display panel from the second casing.

Here, there are two left and right hinge members 130A and 130B and wires. Shapes of the hinge members 130A and 130B and a structure of the second casing 120 relating to the hinge members which are features of the embodiment will be described.

Figure 4:
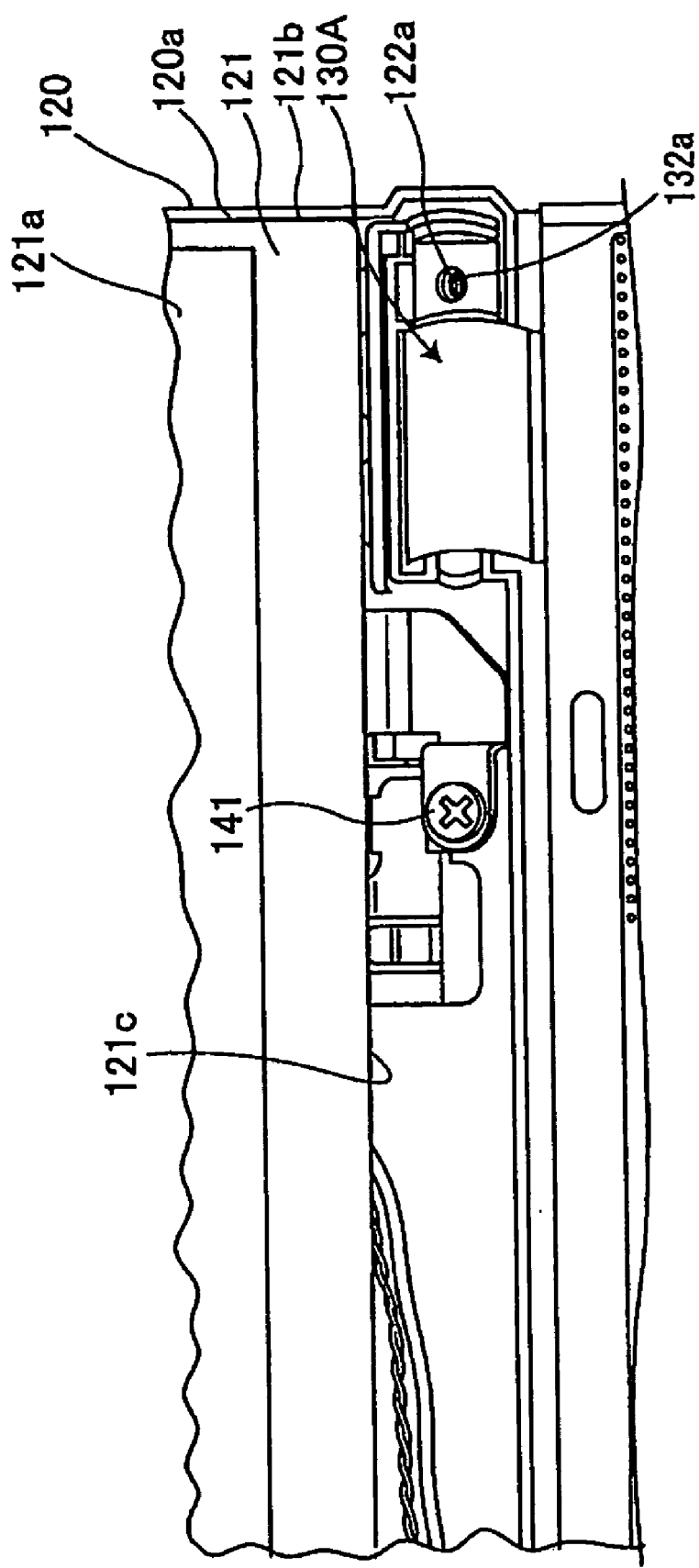
FIG. 4 is an enlarged view of a portion of a right hinge member shown in FIG. 3.

FIG. 4 is an enlarged view of a portion of the right hinge member shown in FIG. 3.

FIG. 4 shows a state where a front cover face (not shown) covering a portion of the second casing 120 around the hinge member 130A is removed, and the display panel 121 remains mounted. The front cover face is a frame member forming a section from which the display screen 121a is exposed. The second casing 120 includes the front cover face and a back cover face, and the display panel 121 is accommodated in the second casing 120 by these covers.

A boss formed with a screw hole 122a stands on the second casing 120. A fastening hole 132a is formed in the hinge member 130A at a position where the screw hole 122a and the fastening hole 132a are liked to each other. The hinge member 130A is screwed to the screw hole 122a by a screw member passing through the fastening hole 132a, but the screw hole 122a is screwed together by a fastening hole (not shown) of a cover provided at a location where the removed front cover face and the screw hole 122a are linked with each other. Here, when the front cover face is removed, the screw member is also removed, and the screw hole 122a is exposed. The other screw portion of the hinge member 130A is screwed to the second casing 120 irrespective of the front cover face. Thus, the screw member 141 is exposed here.

The display panel 121 is spread to a position where its side face 121b comes into contact with an inner face of a sidewall 120a of the second casing 120, and the display panel having the maximum lateral width with respect to a lateral width of the second casing 120 is mounted.

Figure 5:
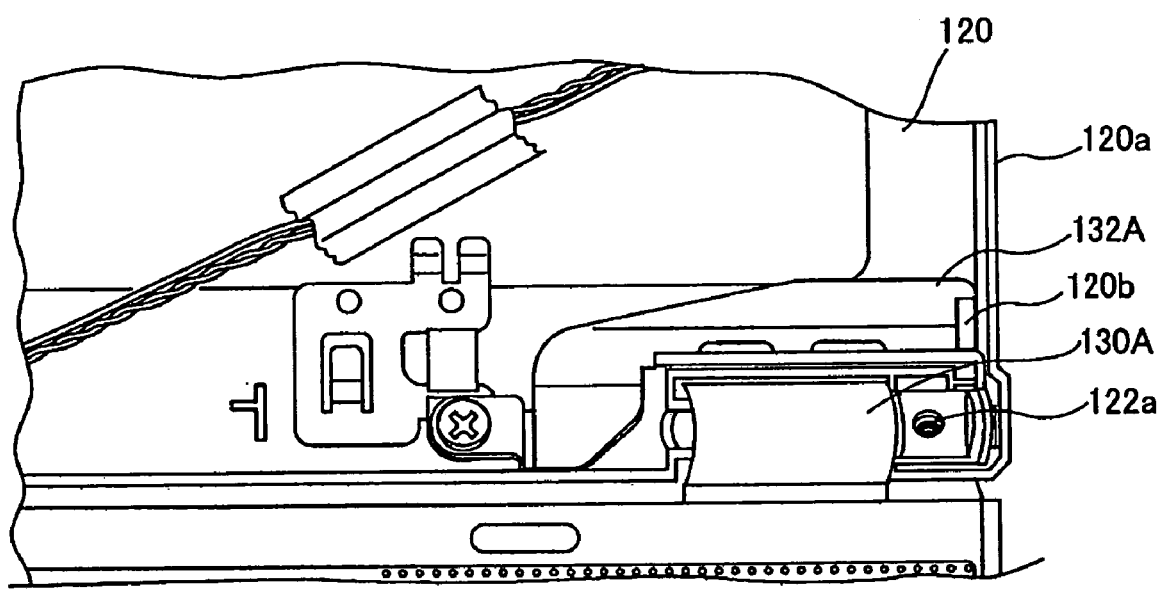
FIG. 5 is an enlarged view of the portion of the right hinge member shown in FIG. 3.

FIG. 5 is an enlarged view of a portion of the right hinge member shown in FIG. 3 like FIG. 4. In FIG. 5, the display panel is also removed.

Figure 6:
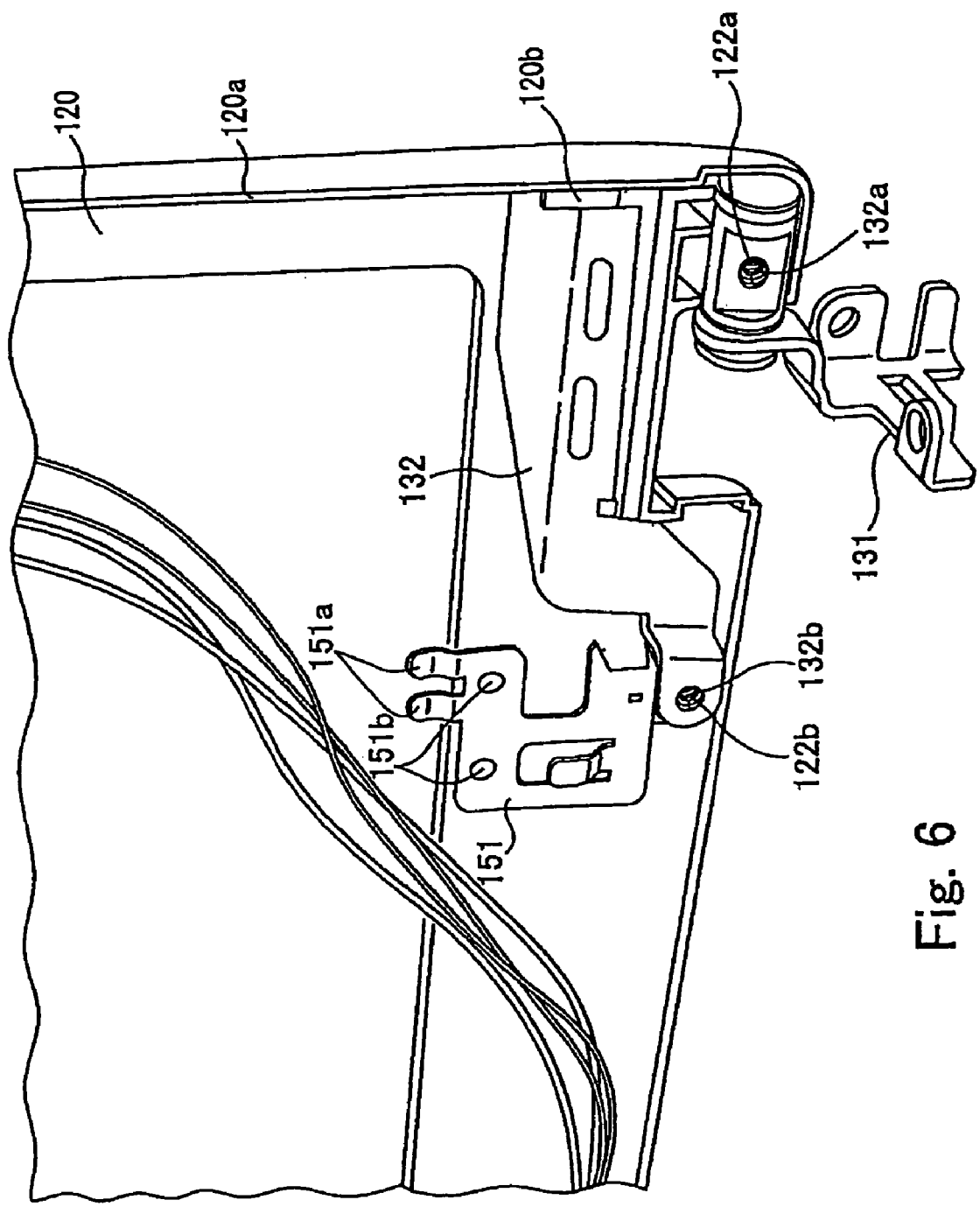
FIG. 6 is a perspective view showing a state where a first casing is removed from the state shown in FIG. 5.
Figure 7:
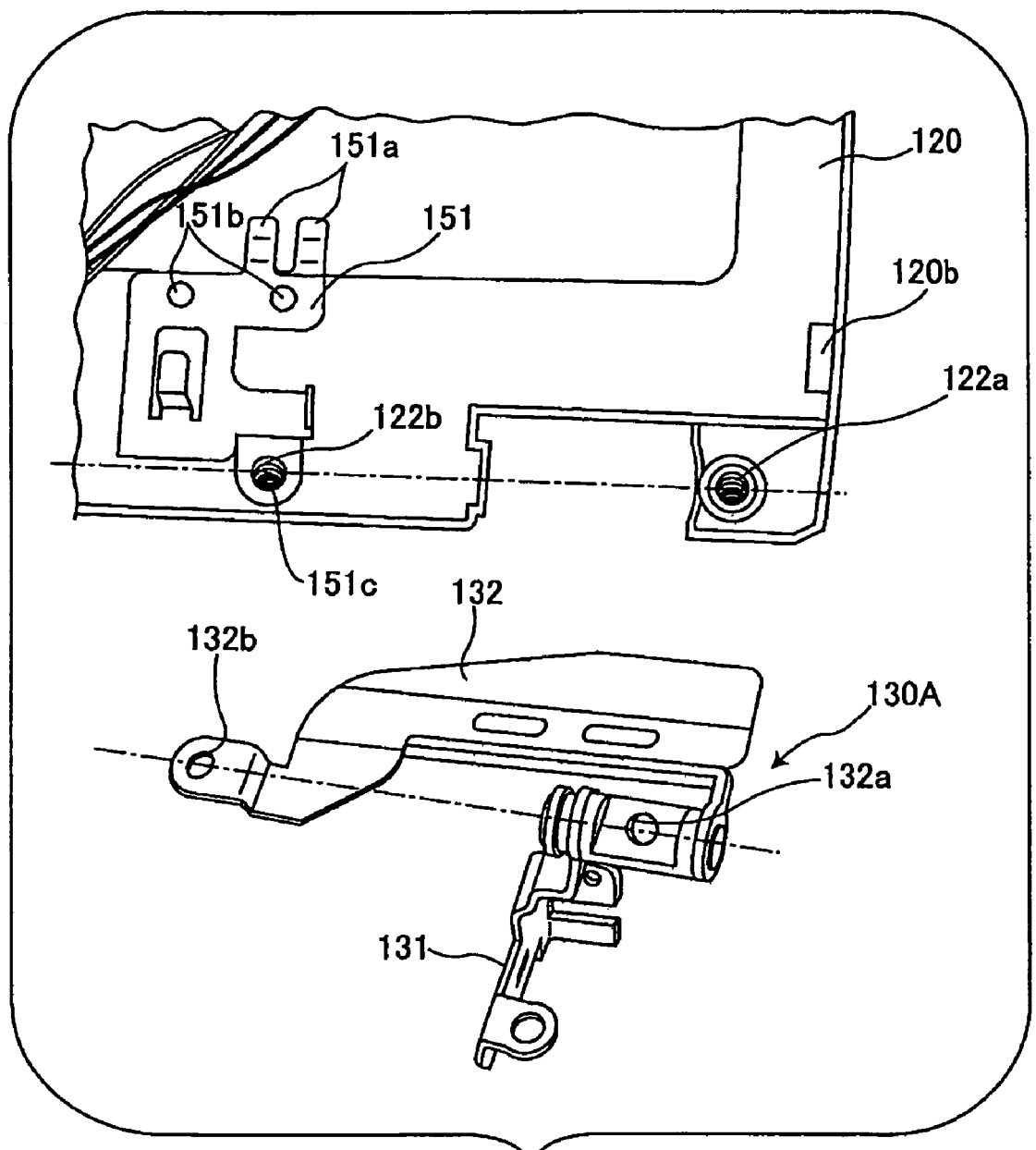
FIG. 7 is a view of a state where a hinge member is removed from the second casing, and a portion of the second casing on which the hinge member is mounted and the hinge member are arranged.

FIG. 6 is a perspective view showing a state where the first casing is removed from the state shown in FIG. 5. FIG. 7 is a view of a state where the hinge member is removed from the second casing, and a portion of the second casing on which the hinge member is mounted and the hinge member are arranged.

The hinge member 130A includes a first fixing member 131 fixed to the first casing, and a second fixing member 132 fixed to the second casing. A portion between the first fixing member 131 and the second fixing member 132 rotates around a rotation axis extending in a direction connecting two fastening holes 132a and 132b provided in the second fixing member 132 with friction. Two bosses formed with the screw holes 122a and 122b stand from the second casing 120 from its back face. In a state where the hinge member 130A is screwed to the second casing 120, the rotation axis of the hinge member 130A is located on a straight line connecting these two screw holes 122a and 122b with each other.

As shown in FIGS. 5 and 6, a projection 120b projecting inward is formed on a lateral wall 120a of the second casing 120. The projection 120b projects while leaving a gap into which one end of the second fixing member 132 which spreads into a plate shape is inserted. The second fixing member 132 is fixed to the second casing 120 and is a part of the hinge member 130A. One end of the second fixing member 132 which spreads into a plate shape enters between the back face of the second casing 120 and the projection 120b and engaged and fixed thereto.

As can be found from comparison of FIGS. 4 and 5, the back face of the display panel 121 is overlapped on the projection 120b and a portion of the second fixing member 132 which spreads into the plate shape.

The one end of the second fixing member 132 constituting the hinge member 130A which is formed into the plate shape enters under the projection 120b and is engaged with the projection 120b, and the one end passes on the side of the back face of the display panel 121 toward the other end and spreads into the plate shape. The other end thereof extends below a lower end face 121c of the display panel 121, and the other end is fastened to the second casing by the screw member 141 at a location where the other end is not overlapped on the display panel 121.

A portion of the second fixing member 132 which extends below the lower end face 121c of the display panel 120 is bent into a direction where the rotation axis of the hinge member 130A is directed in the vertical direction, and rises in the thickness direction of the second casing 120. Further, the portion of the second fixing member 132 is again bent in parallel to the back face of the second casing 120, and a screwing fastening hole 132b is formed in that portion.

As described above, the second casing is provided at its portion corresponding to the fastening hole 132b with a boss which projects from the back face of the second casing 121 and which is formed with the screw hole 122b. The second fixing member is also fixed by the screw member 141 (see FIG. 4) which is inserted into the fastening hole 132b to threadedly enter the screw hole 122b.

When the second casing 120 is opened or closed, a large load is applied around the rotation axis of the hinge member 130A, but since the second fixing member 132 is bent in the direction perpendicular to the rotation axis, the structure of the case is strong against this load.

As shown in FIG. 6 and the like, there is provided a grounding member 151 which comes into contact with the back face of the display panel 121 shown in FIG. 4 and which connects the display panel 121 to the ground. The grounding member 151 is provided at its one end with a contact piece 151a which comes into resilient contact with the back face of the display panel 121. The grounding member 151 is welded to the second casing 120 by means of welding portions 151b. The other end of the grounding member 151 is bent into a shape which rides on a boss standing on the second casing, a fastening hole 151c (see FIG. 7) is formed, and this other end is screwed to the second fixing member 132 of the hinge member 130A by a screw member which threadedly enters the screw hole 122b.

Here, the second casing 120 is made of magnesium alloy which is one of conductive materials, and the screwing allows the display panel 121 to be grounded to the second casing 120 together with the hinge member 130A, and static electricity to be prevented from being generated.

Figure 8:
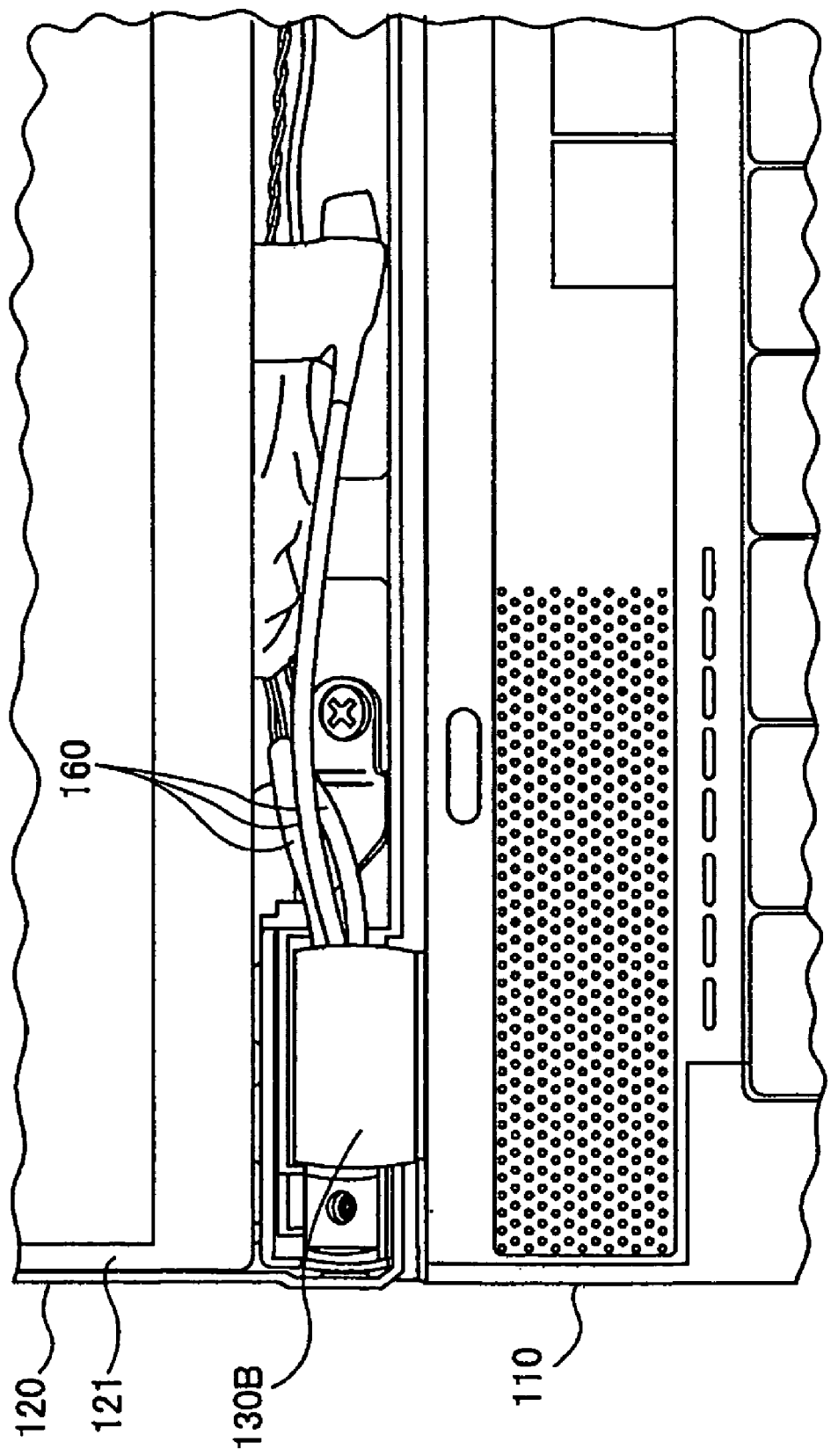
FIG. 8 is an enlarged view of a portion of the other hinge member shown in FIG. 3 on which the display panel is mounted.
Figure 9:
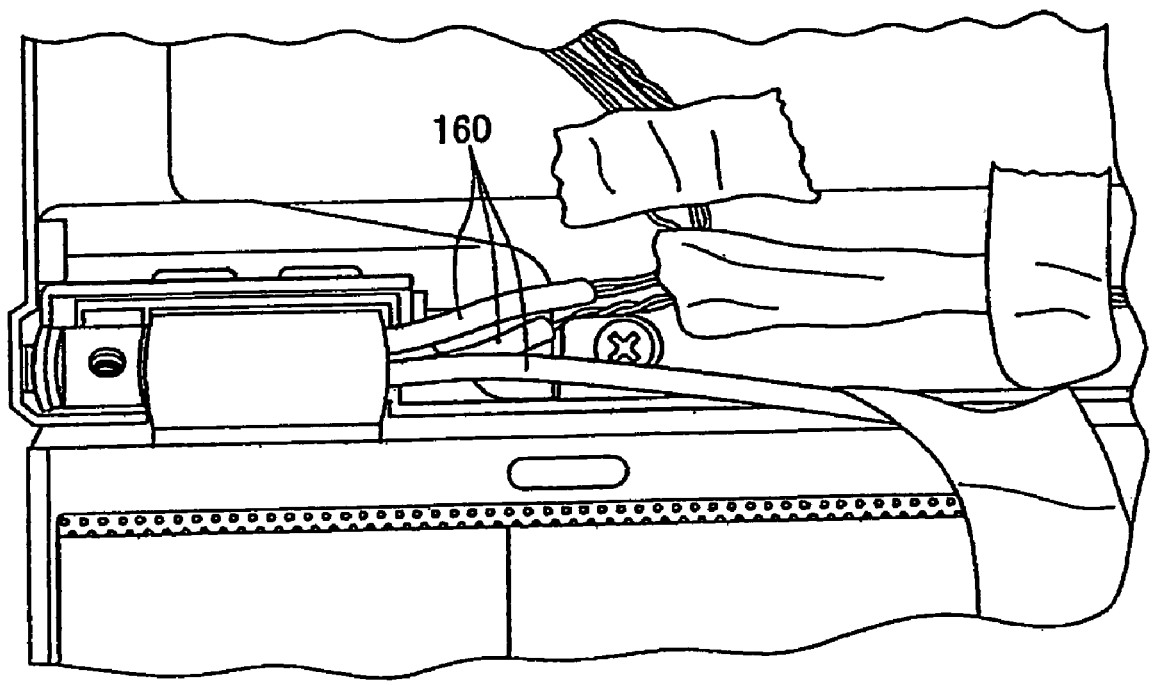
FIG. 9 is an enlarged view of a portion of the other hinge member shown in FIG. 3, in which the display panel is removed.

FIGS. 8 and 9 are enlarged views of a portion of the other hinge member 130B shown in FIG. 3. FIG. 8 shows a state where the display panel is mounted, and FIG. 9 shows a state where the display panel is removed.

The hinge member 130B has a structure which is laterally flipped as compared with the other hinge member 130A. Structures of the second casing 120 and peripheries of the hinge member 130B of the display panel 121 are the same as those of the peripheries of the hinge member 130A except that the structures are laterally flipped. The rotation axis of the hinge member 131B matches with the rotation axis of the other hinge member 131A.

Another apparent difference in addition to the laterally flipped structure is that a wire 160 extends between the first casing 110 and the second casing 120 in the hinge member 130B.

Since the wire 160 passes through the hinge member 130B, it is possible to prevent excessive force from being applied when the second casing is opened or closed, and failure such as disconnection is avoided.

What is claimed is:

1. An electronic device comprising:
   a first casing;
   a second casing having a display panel provided with a display screen which displays information and which is exposed; and
   a hinge member which connects the second casing and the first casing with each other such that the second casing can open and close with respect to the first casing, wherein
   the second casing includes a back face and a sidewall having a projection which projects inward between the back face and the sidewall,
   the hinge member includes a first fixing member fixed to the first casing and a second fixing member fixed to the second casing, and
   one end of the second fixing member is engaged with and fixed to the second casing without using a fixing member in a state where the one end enters a gap between the back face and the projection.

2. The electronic device according to claim 1, wherein a back face of the display panel is overlapped on the projection.

3. The electronic device according to claim 1, wherein a side face of the display panel is mounted on the second casing in a state where the side face of the display panel is in contact with an inner face of the sidewall.

4. The electronic device according to claim 1, wherein the second fixing member includes a fastening hole on a rotation axis of the hinge member, and the second fixing member is fastened to the second casing using the fastening hole.

5. The electronic device according to claim 1, wherein the one end of the second fixing member enters the gap, and the other end of the second fixing member is fastened to the second casing.

6. The electronic device according to claim 5, wherein the second fixing member spreads into a plate shape from the one end to the other end while passing on the side of the back face of the display panel, and the other end extends below a lower end face of the display panel, and is fastened to the second casing at a location where the other end is not overlapped on the display panel.

7. The electronic device according to claim 5, wherein the other end of the second fixing member is bent in a direction in which the rotation axis of the hinge member is a normal and rises in a thickness direction of the second casing, and the other end is further bent in a direction parallel to the back face of the second casing and is formed with a screwing fastening hole, the second casing is provided at its portion corresponding to the fastening hole with a boss which projects from the back face of the second casing and which is formed with a screw hole, and the second fixing member is fastened to the second casing by a screw member which is inserted into the fastening hole and threadedly inserted into the screw hole.

8. The electronic device according to claim 4, wherein the second casing includes a frame member formed with a section from which the display screen is exposed, the frame member having a fastening hole of the second fixing member, the second casing is provided at its portion corresponding to the fastening hole with a boss which projects from the back face of the second casing and which is formed with a screw hole, and the second fixing member is fastened to the second casing by a screw member which is inserted into the fastening hole of the second fixing member through the fastening hole of the frame member and which is threadedly inserted into the screw hole.

9. The electronic device according to claim 1, wherein the second casing is made of a conductive material, and the electronic device further comprises a grounding member whose one end is in contact with the display panel and whose other end is fastened to the second casing together with the second fixing member.

10. The electronic device according to claim 1, wherein the first casing has an arithmetic circuit incorporated therein for carrying out arithmetic processing, and the first casing is provided at its upper face with a keyboard for inputting a command corresponding to an operation.

* * * * *